Feb. 7, 1956 J. A. RAJCHMAN 2,734,183

MAGNETIC SWITCHING DEVICES

Filed Dec. 22, 1952 5 Sheets-Sheet 1

INVENTOR
Jan A. Rajchman
BY Morris A. Rabkin
ATTORNEY

Feb. 7, 1956 J. A. RAJCHMAN 2,734,183

MAGNETIC SWITCHING DEVICES

Filed Dec. 22, 1952 5 Sheets-Sheet 2

INVENTOR.
Jan A. Rajchman
BY Morris A. Rabkin
ATTORNEY

Feb. 7, 1956 J. A. RAJCHMAN 2,734,183

MAGNETIC SWITCHING DEVICES

Filed Dec. 22, 1952 5 Sheets-Sheet 3

/ =N WINDING
\ =P WINDING

INVENTOR
Jan A. Rajchman
BY Morris Robbins
ATTORNEY

INVENTOR.
Jan A. Rajchman
BY Morris A. Rabin
ATTORNEY

Feb. 7, 1956 J. A. RAJCHMAN 2,734,183

MAGNETIC SWITCHING DEVICES

Filed Dec. 22, 1952 5 Sheets-Sheet 5

/ = N WINDING
\ = P WINDING

INVENTOR
Jan A. Rajchman
BY Morris G. Rabkin
ATTORNEY

United States Patent Office 2,734,183

Patented Feb. 7, 1956

2,734,183

MAGNETIC SWITCHING DEVICES

Jan A. Rajchman, Princeton, N. J., assignor to Radio Corporation of America, a corporation of Delaware Application December 22, 1952, Serial No. 327,234

26 Claims. (Cl. 340—166)

This invention relates to magnetic commutators or switches such as used for supplying bits of information to the magnetic memory systems of computers and similar information-handling machines.

The present invention is an improvement upon magnetic commutators of the type disclosed in my copending application Serial No. 302,161 and in an article by J. A. Rajchman entitled "Static Magnetic Matrix Memory and Switching Circuits," in "RCA Review," volume XIII, No. 2, June 1952. The switches described employ cores preferably toroidal in shape. These cores are driven from one saturation polarity to another selectively by means of coils which are inductively coupled to the cores. The coupling to each core is by means of windings. A number of different windings on different cores when connected together in series are known as a coil. The selective drive may be made by applying currents to a number of coils coupled to a desired core.

In general, a magnetic switch affording $2^n$ outputs requires $2^n$ saturable cores which are excited from "$n$" pairs of input coils. These input coils are inductively coupled to the magnetic cores in accordance with a coupling code. The particular switching arrangements shown in the aforesaid disclosures are efficient in operation but when the required number of inputs is large, the coil winding linking each core are not efficiently used because a greater proportion of them remain idle as a particular core is being switched, i. e., reversed in direction of saturation. Also, when the required number of inputs is large, the construction of the magnetic switch becomes increasingly more difficult. The general objective of this invention is to overcome these disadvantages.

In accordance with the present invention, to reduce the required number of winding turns per core and more efficiently to utilize the winding space of the individual cores, there is utilized a cumulative commutator arrangement in which the pairs of input coils are divided into groups for respectively addressing the successive commutators. The first commutator of the series, for brevity herein termed the driving commutator, drives the next commutator which in turn drives the succeeding commutator and so on through the series. The first or driving commutator has a single section, the number of cores in this section not exceeding 2 raised to a power equal to the number of coil pairs in the first group of input coils. Each of the driven commutators is a multi-section commutator, the number of sections corresponding with the number of cores per section of the preceding commutator, and the number of cores per section of the driven commutator corresponding with 2 raised to a power not exceeding the number of pairs of inputs addressing that driven commutator. With such cumulative commutator arrangement, the required number of input turns per core is substantially reduced, the winding space on each core is more efficiently utilized and construction of a switch for a large number of inputs is facilitated.

Such substantial reduction in the number of conductors or turns per core is obtained even when, as in some embodiments of the invention, the pairs of input coils include both P driving and N-driving or inhibiting windings for each core. The number of required conductors is still further reduced in some modifications of the invention by including only inhibiting windings in some or all of the input coils. More specifically, and in one arrangement for example, the input coils for the driving commutator include only inhibiting windings respectively inductively related to only certain of the cores and there is an additional coil linking all cores of the driving commutator and in circuit with the input coils of the driven commutators, such arrangement further reducing the preferred number of turns per core. Furthermore, and preferably, the input coils for each driven commutator include only inhibiting windings, the selection of a particular core of the driven commutator being determined by the selection of a particular core of the preceding commutator, and the selection of an individual core of the selected section of the driven commutator being determined by the pattern of the selectively energized inhibiting windings.

The invention further resides in magnetic commutator arrangements having the features of novelty and utility hereinafter described and claimed.

For a more complete understanding of the invention and for illustration of embodiments of it, reference is made to the accompanying drawings in which:

Fig. 1 schematically illustrates a cumulative magnetic commutator affording selection of any one of 64 outputs from 6 inputs;

Fig. 2 diagrammatically illustrates, on larger scale, the elements of a single section of the driven commutator of Fig. 1;

Fig. 3 schematically illustrates a modification in which the input coils include only inhibiting windings;

Figure 3:
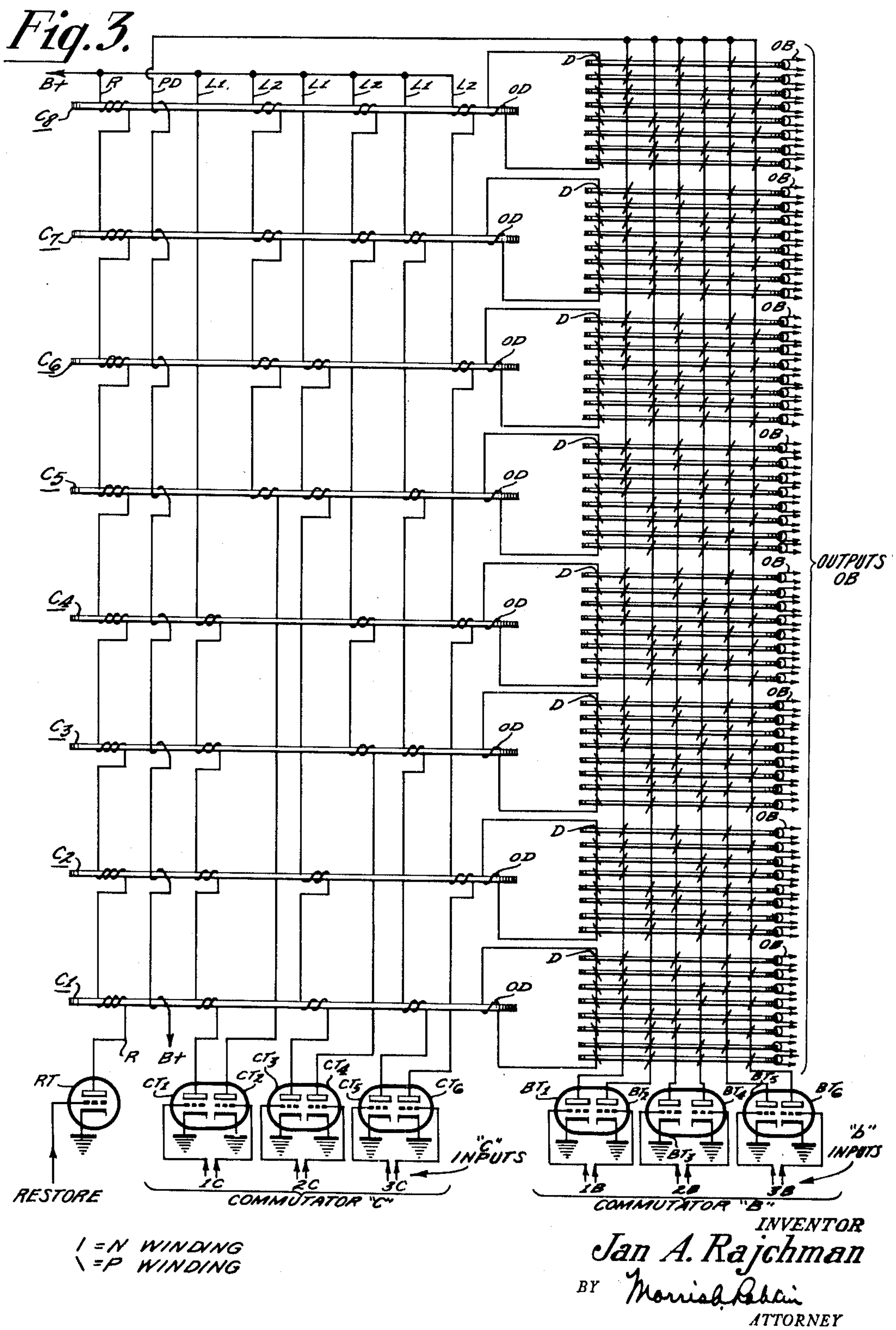

In the magnetic commutator shown in Fig. 3 of the aforesaid RCA Review article, there are "$n$" pairs of input driving windings on each core. For brevity and using adopted terminology, the input windings which tend to preclude the reversal of saturation of the cores from their original state are called the "N" or inhibiting windings and the driving windings which tend to effect reversal of the direction of saturation of the cores are called the P-driving windings. The number of turns of each N-driving winding is $(n-1)$ times that of the P-driving winding. Consequently, for each input pair the number of input turns on each core is a multiple of $n$, (i. e., is at least $n$). Since there are $n$ inputs, the number of windings on each core is a multiple of $n^2$. When, as assumed for simplicity, the restoring winding on each core is driven by a tube of current output equal to that of the input driving tubes, such restoring winding requires a number of turns proportional to $n$. Therefore in all, there are $Kn(n+1)$ turns in the total windings on each core exclusive of output windings, i. e., there are at least $n(n+1)$ turns when K is unity, a case herein assumed for sake of simplicity of explanation.

When the number of inputs $n$ becomes large, it is physically difficult to construct such a switch since the number of primary turns required on each core increases as the factor $n(n+1)$. Moreover, since only $n$ out of the total number of $n(n+1)$ turns actually carry current during a core-switching operation, the remaining $n^2$ turns are idly standing-by and the efficiency of utilization of the winding space of the core is poor. By way of example, for a commutator with 7 input pairs affording 128 outputs with a binary code (or a lesser number with a truncated code, 100 for example), there would be a minimum of 56 turns required for the primary of each core. As the preferred form of core is a small toroid having for example a diameter of the order of one-eighth inch, the difficulty of winding the cores for such number of inputs is apparent.

In accordance with the present invention, these difficulties are overcome by cascading magnetic commutators. For simplicity of explanation, the cumulative commutator arrangement shown in Fig. 1 includes only two commutators, commutator A and commutator B, and the inputs are divided into two groups of input pairs. For cumulative commutator arrangements having a greater number of commutators, the inputs would be divided into a correspondingly greater number of input pairs. In the arrangement shown in Fig. 1, the $n$ inputs (6 in number) are divided into two groups, of three each, i. e., $n=(a+b)$, both $a$ and $b$ being equal to 3. The *"a"* group of inputs, inputs 1A–3A of Fig. 1, address the commutator A and the *"b"* group of inputs, inputs 1B–3B of Fig. 1, address the commutator B.

Figure 1:
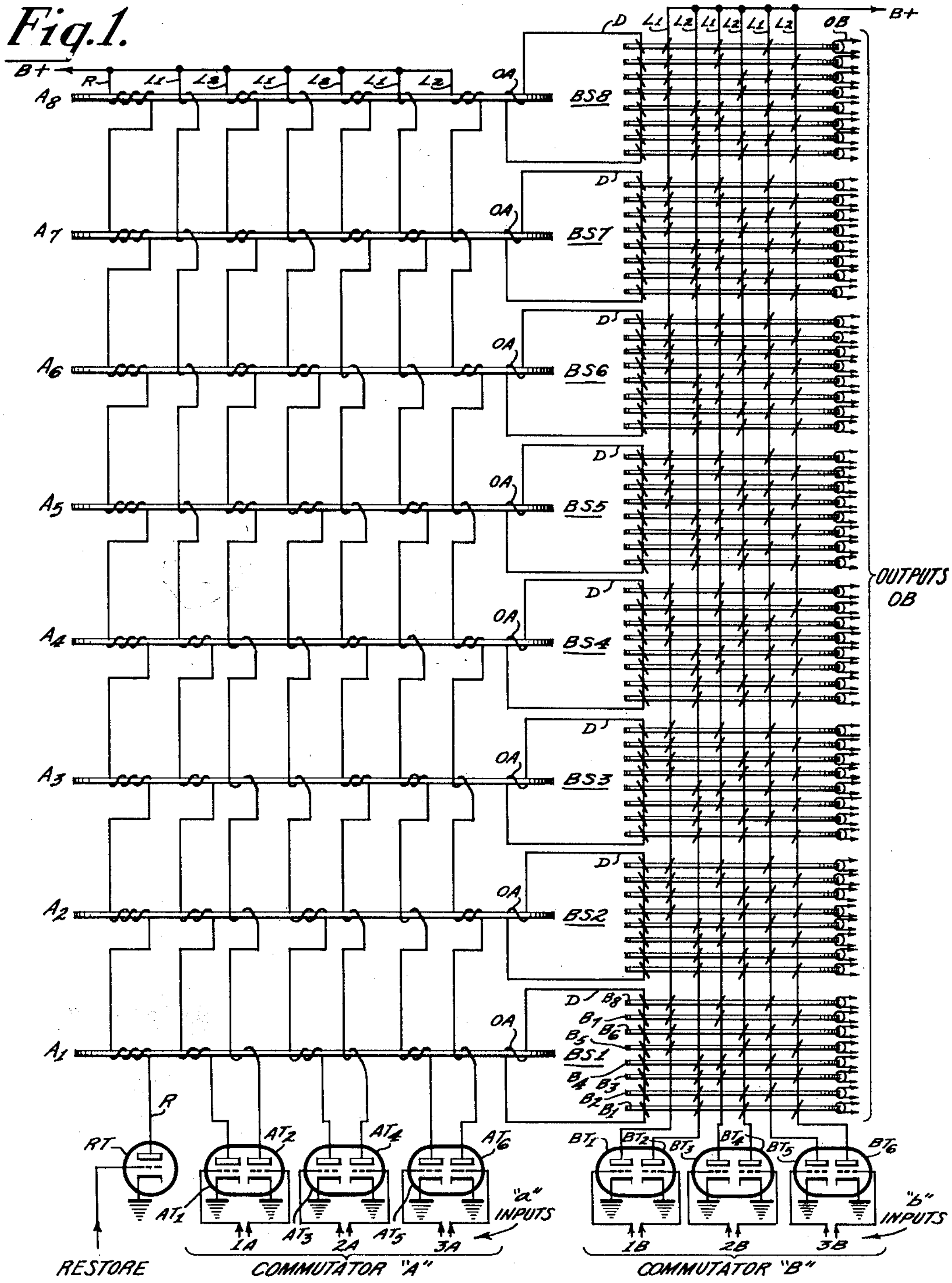

Each of the input channels 1A–3A comprises a pair of coils L1, L2, each including P-driving and N-driving windings distinguishable in Fig. 1 by use of the convention appearing in the lower left of Fig. 1. For brevity, the term "coil" is used to designate the group of core windings which are included in a common energizing circuit: specifically in Fig. 1, the eight core windings in series in the anode circuit of tube AT1 constitute a single commutator coil and such coil is one of the pair constituting the input or address channel 1A. As shown, the coils are inductively coupled to the cores in a combinational code or pattern. As will later appear, concurrent energization of a selected one of each of these three pairs of input coils will uniquely determine which of the eight cores of commutator A reverses in direction of its saturation. Each of the cores A1–A8 of commutator A is provided with an output winding OA which is momentarily excited upon reversal in direction of saturation of the associated core.

The outputs of commutator A, in number equal to 8 (or $2^a$) are utilized in selective drive of the 64 (or $2^n$) cores of the second commutator B. The cores of the driven commutator B are arranged in $2^a$ sections of $2^b$ cores each: specifically, in the arrangement of Fig. 1 the driven commutator comprises 8 sections (BS1–BS8), one for each core of the single section driving commutator A, the number of cores in each section of commutator B being 8 (or $2^b$). Each section of the driven commutator B is provided with a driving coil D inductively coupled to each core of that section and connected to the output coil OA of a corresponding one of the cores of commutator A. Thus, upon reversal of the saturation of any one of the cores A1–A8 of commutator A, a driving pulse is applied to all cores B1–B8 of the corresponding one of the sections BS1–BS8 of the driven commutator B. Which of the cores of the so selected section of commutator B is reversed in saturation, depends, as later explained, upon the address of the *"b"* input.

The cores of all sections BS1–BS8 of the commutator B are linked by pairs of coils L1, L2, one pair for each of the *"b"* channels 1B, 2B, 3B. All of the input coils of the driven commutator B preferably, and as shown, include only N-driving or inhibiting windings coupled in a combinational code to the cores of each section. Each of the cores B1–B8 of each section of the driven commutator B is provided with an output winding OB, so affording $2^n$ or 64 outputs.

Figure 2:
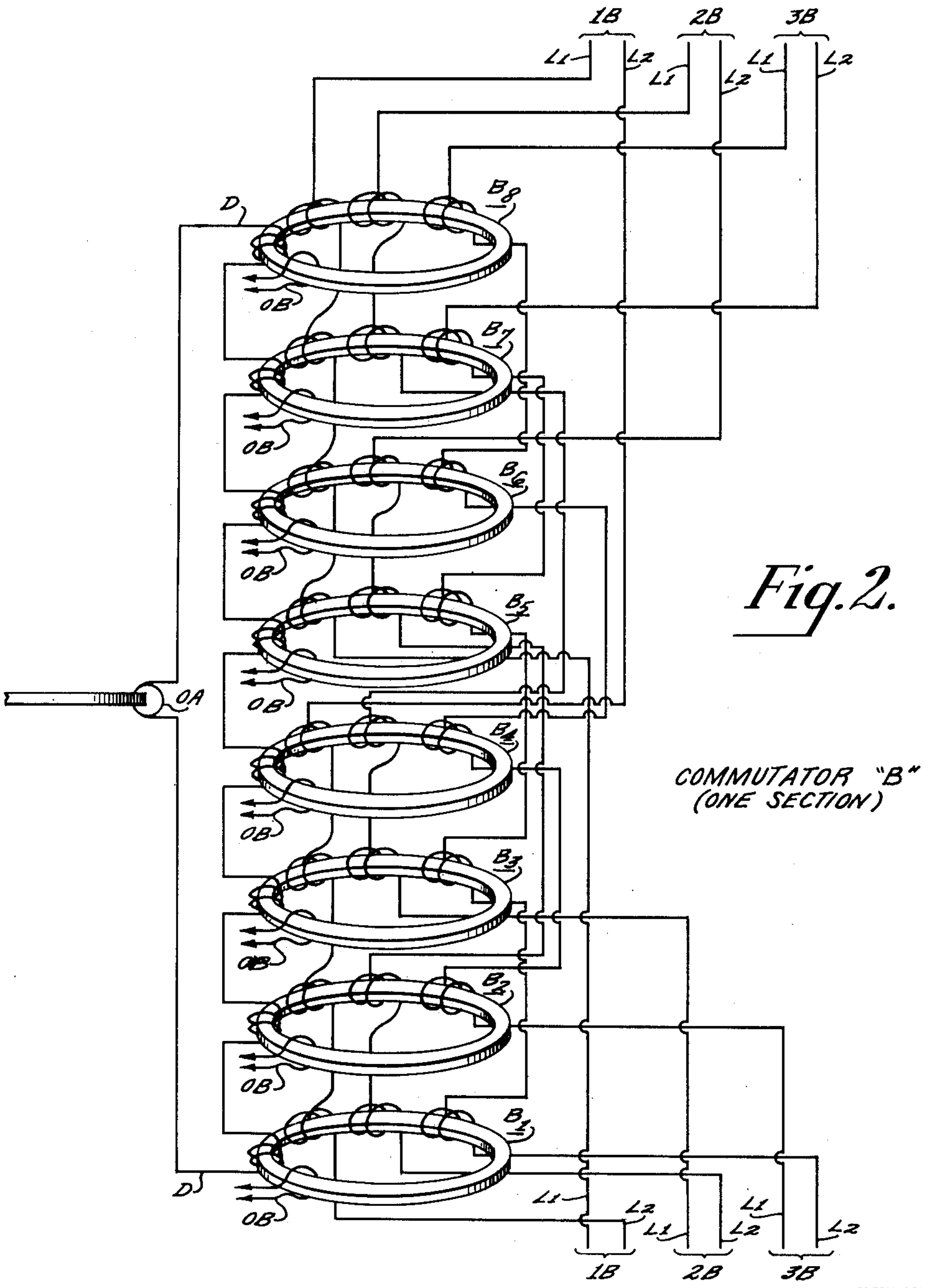

For clarity of illustration, one section of commutator B is separately shown on larger scale in Fig. 2. The cores of this section, like the cores of a single section of commutator A, are preferably individual toroidal cores made of a magnetic material.

In description of operation of the system of Fig. 1, it will be assumed that all cores are initially in a state of N-saturation. In selection of a particular output of the commutator B, all inputs 1A–3A and 1B–3B are applied simultaneously in accordance with the corresponding address, i. e., one coil of each pair L1, L2 of the two groups of inputs is excited, or, more specifically, one of each of the pairs of address tubes (AT1, AT2), (AT3, AT4), (AT5, AT6), (BT1, BT2), (BT3, BT4), (BT5, BT6) is made to conduct. As later more specifically explained, this causes one and only one core of commutator A to "turn over" from N to P, and this reversal in direction of saturation causes current to be induced in the corresponding output coil OA of commutator A. This output pulse of the selected core of commutator A tends to drive all cores of the corresponding selected section of the driven commutator B towards P-saturation, and it will actually effect reversal in saturation of a selected one of the cores of that section depending upon the address of the $b$ input group. Specifically, and as later more fully explained, the core of the selected section of commutator B which turns over is the one, none of whose inhibiting or N-driving windings are excited. For all other $(2^b-1)$ cores, there will be, as later shown, at least one $b$ input winding which will inhibit sufficiently to prevent switch-over. Consequently, one and only one, of the $2^n$ cores of commutator B will turn over to P-saturation, while all others will remain at the original N-saturation.

The manner in which this selection is made will become more clear by reference to Tables I–IV below and the following explanation:

TABLE I

*Commutator A—(Fig. 1)*

| "A" Address | 1A Input | | 2A Input | | 3A Input | |
|---|---|---|---|---|---|---|
| | AT1 | AT2 | AT3 | AT4 | AT5 | AT6 |
| 1 | | √ | | √ | | √ |
| 2 | | √ | | √ | √ | |
| 3 | | √ | √ | | | √ |
| 4 | | √ | √ | | √ | |
| 5 | √ | | | √ | | √ |
| 6 | √ | | | √ | √ | |
| 7 | √ | | √ | | | √ |
| 8 | √ | | √ | | √ | |

In Table I:

Each row indicates the "A" address listed in the left hand column. Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE II

*Input winding pattern—commutator A (Fig. 1)*

| Core | Windings | | | | | |
|---|---|---|---|---|---|---|
| | 1A Input | | 2A Input | | 3A Input | |
| | AT1 | AT2 | AT3 | AT4 | AT5 | AT6 |
| A1 | N | P | N | P | N | P |
| A2 | N | P | N | P | P | N |
| A3 | N | P | P | N | N | P |
| A4 | N | P | P | N | P | N |
| A5 | P | N | N | P | N | P |
| A6 | P | N | N | P | P | N |
| A7 | P | N | P | N | N | P |
| A8 | P | N | P | N | P | N |

TABLE III

*Each section of commutator B (Fig. 1)*

| "B" Address | 1B Input | | 2B Input | | 3B Input | |
|---|---|---|---|---|---|---|
| | BT1 | BT2 | BT3 | BT4 | BT5 | BT6 |
| 1 | √ | | √ | | √ | |
| 2 | √ | | √ | | | √ |
| 3 | √ | | | √ | √ | |
| 4 | √ | | | √ | | √ |
| 5 | | √ | √ | | √ | |
| 6 | | √ | √ | | | √ |
| 7 | | √ | | √ | √ | |
| 8 | | √ | | √ | | √ |

In Table III:

Each row indicates the "B" address listed in the left hand column. Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE IV

*"B" input winding pattern—each section of commutator B (Fig. 1)*

| Core | Windings | | | | | |
|---|---|---|---|---|---|---|
| | 1B Input | | 2B Input | | 3B Input | |
| | BT1 | BT2 | BT3 | BT4 | BT5 | BT6 |
| B1 | | N | | N | | N |
| B2 | | N | | N | N | |
| B3 | | N | N | | | N |
| B4 | | N | N | | N | |
| B5 | N | | | N | | N |
| B6 | N | | | N | N | |
| B7 | N | | N | | | N |
| B8 | N | | N | | N | |

Referring to Table I, it will be seen that there are eight possible different combinations each consisting of a selected one of the three pairs of input coils of commutator A. In other words, there are eight distinct ways of addressing commutator A. Referring to Table II, which shows the combinational winding pattern of the cores of commutator A in tabular form, it will be seen that by masking one of each of the three input columns in accordance with the address of Table I, that for each selection No. 1 to No. 8 there is one, and only one, core, all of whose P-windings are excited. For example, if the 1st, 4th and 6th column of Table II are masked in accordance with the No. 4 address of Table I, it will be seen that core A4 of Commutator A is the only one all of whose P-windings are energized. In similar manner, it will appear that each of the addresses No. 7 to No. 8 of Table I respectively afford a unique selection of the cores A1 to A8 (Table II) and therefore result in application of a P-driving pulse to all of the cores of a corresponding section of the driven commutator B.

Which of the cores of the selected section of driven commutator B will be reversed, can readily be determined by reference to Tables III and IV as explained below.

Table III shows the possible addresses applicable by the *b* group inputs 1B–3B to commutator B. As shown in the table, there are eight different combinations, each involving excitation of one loop of each of the three pairs of input loops. Table IV, in tabular form, shows the combinational winding pattern of the cores B1–B8 of each section of commutator B. By masking out the columns corresponding with the unenergized coils for each of the eight addresses of Table III, it is immediately apparent that for each address there is one, and only one, core which has none of its inhibiting windings energized. For example, assuming the No. 6 address for commutator B (Table III) is selected, the 1st, 4th and 5th columns of Table IV are masked and it at once appears that core B6 is the only core having no energized N-driving windings. It is therefore this core of the selected selection of the driven commutator B which is switched to P-saturation by the driving pulse from the selected core of commutator A.

To complete the particular example, if the A address is No. 4 (Table I) and the concurrent B address is No. 6 (Table III), the selected core of commutator B is core B6 of section BS4. In like manner any of the $2^b$ cores of commutator B may be selected to obtain an output pulse therefrom.

Reverting to the matter of the required number of turns on the primary windings of the individual cores of the commutators, it will be noted that the number of turns in the primary of each of the cores of driven commutator B is proportional to *b* (the number of input pairs), aside from the driving winding which can always be made a single turn by proper choice of the ratio of the cross section of the cores of commutator A to that of the cores of commutator B. For each core of commutator A, the primary turns (including those of the restoring winding R not yet discussed), are proportional to $a(a+1)$, and in no case, as was true of previous commutators above discussed, is it required to have a number proportional to $n(n+1)$. In the particular arrangement shown in Fig. 1, the required primary turns for the cores of both commutators is only 12 corresponding to $a(a+1)$ where 42 corresponding to $n(n+1)$ would be required on a single core for a single section commutator having the same number (6) of input pairs.

The driving commutator A, in addition to the input coils and individual output windings, includes a restoring loop R comprising N-driving windings for each of the cores. After the commutators have been addressed to write in a bit of information corresponding with the reversed direction of saturation of a particular core of the driven commutator, and after such information has been read out, both commutators are returned to their original state, (all cores with N-saturation), by applying a restoring pulse to the coil R of commutator A. Such pulse may be a positive pulse applied to the grid of restoring tube RT which is normally biased to cutoff and whose plate circuit includes the windings of loop R. Such energization of the restoring loop will apply to the previously selected core of commutator A a negative driving impulse sufficient to reverse saturation of the core and return it to its original N-saturation state. As none of the other cores were reversed and were saturated in the N direction, such negative driving impulse does not affect their state. The reversal in direction of saturation of the selected core of driving commutator A produces in its output winding OA a negative driving impulse applied to all of the cores of the previously selected sections of driven commutator B. This driving impulse is sufficient to return the selected core of that section back to its original state of N-saturation. It has no effect upon the other cores of that section as they remain in the N-direction of saturation.

From the viewpoint of power efficiency, this cumulative commutator arrangement may be slightly less efficient than one using only one set of cores because, to the power required to reverse a B core must be added the power required to reverse an A core. This, however, is only a minor loss when the switching is used efficiently, i. e., when it transmits to the load a large percentage of power applied to it. Such loss is more than offset by the fact that this switch makes practical the utilization of a large number of inputs without the need to provide a large number of turns which are idle for any particular switching operation and whose presence greatly increases the difficulty of winding the core and results in inefficient utilization of the winding space.

A further reduction in the required turns per core for the input driving windings and further economy of coils are obtainable by the system of Fig. 3. In this modification, all of the P-driving windings of the input coils of commutator A of Fig. 1 are replaced by a single P-driving coil PD (Fig. 3) in circuit with all of the input coils of driven commutator B. Each of the pairs of input coils L1, L2 for addressing commutator C has only N-driving windings and such windings are on only certain of the cores in accordance with a combinatorial code, such for example as the binary code shown in Fig. 3. For any selected address to commutator B, the current from the input tubes selected from CT1–CT6 serves both to inhibit unselected cores of commutator B as hereinafter described and also applies P-drive to all cores of the driving commutator C. This reduces the number of required input turns on cores C1–C8 of commutator C to a number proportional to $c$ where $(c+b=n)$ aside from the additional PD winding which need have only a few turns per core.

The mode of operation of the cumulative commutator arrangement of Fig. 3 should be clear by reference to Tables V, VI below and preceding Tables III, IV.

TABLE V

*Commutator C (Fig. 3)*

| "C" Address | 1C Input | | 2C Input | | 3C Input | |
|---|---|---|---|---|---|---|
| | CT1 | CT2 | CT3 | CT4 | CT5 | CT6 |
| 1 | | √ | | √ | | √ |
| 2 | | √ | | √ | √ | |
| 3 | | √ | √ | | | √ |
| 4 | | √ | √ | | √ | |
| 5 | √ | | | √ | | √ |
| 6 | √ | | | √ | √ | |
| 7 | √ | | √ | | | √ |
| 8 | √ | | √ | | √ | |

In table V:

Each row indicates the "C" address listed in the left hand column. Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE VI

*Input wind pattern—commutator C (Fig. 3)*

| Core | Windings | | | | | | |
|---|---|---|---|---|---|---|---|
| | 1C Input | | 2C Input | | 3C Input | | B Input |
| | CT1 | CT2 | CT3 | CT4 | CT5 | CT6 | |
| C1 | N | | N | | N | | PD |
| C2 | N | | N | | | N | PD |
| C3 | N | | | N | N | | PD |
| C4 | N | | | N | | N | PD |
| C5 | | N | N | | N | | PD |
| C6 | | N | N | | | N | PD |
| C7 | | N | | N | N | | PD |
| C8 | | N | | N | | N | PD |

Referring to Table V, there are eight possible combinations of selected ones of the pairs of input coils L1, L2 of the group of inputs 1C–3C. By masking out the columns of Table VI in accordance with each address of Table V, it will be seen that for each address there is one core, and only one core of commutator C having none of its C input windings energized. By way of specific example, for the No. 3 address of Table V, the 1st, 4th and 5th columns of Table VI are masked (no energization of these coils), and it at once appears that core C3 is the only one having none of its input coils energized. Such core will be driven from its N to its P state of saturation by the P-driving impulse supplied to the PD coil of commutator C by the concurrent address to commutator B. In like manner, it can be shown that for each of the addresses Nos. 1 to 8 of Table V, the selected cores of commutator C are respectively C1–C8, providing, of course, that as usual commutator B is concurrently addressed.

From this discussion and from the previous discussion of Tables III and IV for commutator B, it is believed clear that each selection of one of the pairs of the two input groups C, B, there is selected a corresponding core of the driven commutator B. To use the illustrations above, for the No. 3 C address (Table V) and the No. 6 B address (Table III), core C3 of commutator C changes from N-saturation to P-saturation, to provide a P-driving impulse to all of the cores of section BS3 of commutator B and all cores of that section are inhibited or precluded from turnover except the core B6. From this example and the tables, which one of the 64 cores of commutator B is driven from N to P state of saturation for any selection of one coil of each input pair of both groups can readily be determined.

It may be noted that the present invention may be considered as a very special case of the universal magnetic switching system described in aforesaid copending application Serial No. 302,161 in which the arbitrary switching function wired into the switch is one amounting to selection of a single-channel out of many from an input command having a few inputs. This special case of the aforesaid universal switch here concerns a reduction in the number of windings rather than a reduction in the number of cores. Furthermore, in the previous copending application each of the cores in an "A" group of cores could be selected to drive a single core in each of a number of core groups. A "B" core input consisted of inhibiting coils coupled in accordance with a desired code. This B input determined which of the B cores would not turn over in response to drive from the A cores.

In the present invention, in addition to effectuating an economy in windings instead of one core in each group of B cores receiving a P drive, an entire B core group or B commutator is driven by an A, (or C) core.

When, as in commutator A of Fig. 1 hereof or, for example, in Fig. 3 of aforesaid publication in RCA review, the input coils include both P-driving and N-driving windings, restoration can be obtained without use of a restoring coil R. Instead restoration can be effected by energizing all input loops since each core will then be driven by $n(n-2)$ turns toward N saturation. This drive may be in excess of the drive to P which is only proportional to $n$. In order to make the N-drive equal to the P-drive, both sides need be simultaneously excited in only $m$ inputs where $$m=\frac{n}{n-2}$$

One or two input pairs should be so excited when $n$ is greater than 4 because $m$ is an integer only for $n=3$ and $n=4$ when $m=3$ (all pairs) and $m=2$ (half of all pairs) respectively and because for larger values of $n$, $m$ approaches unity.

Figure 5:
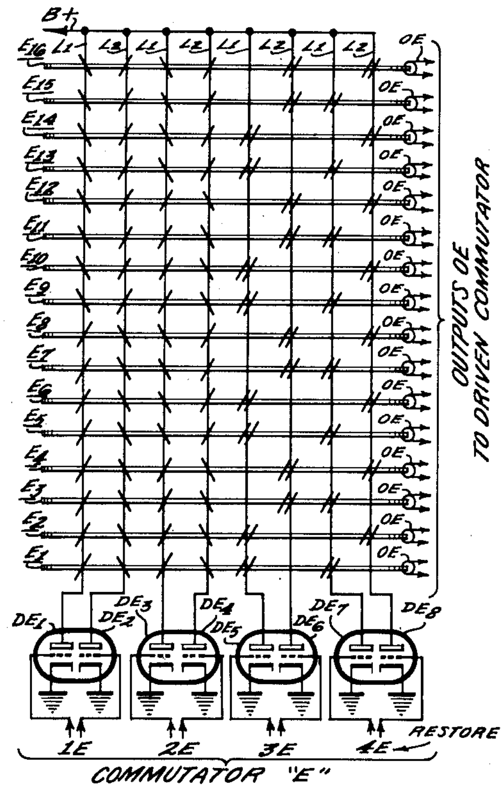
Figure 5A:
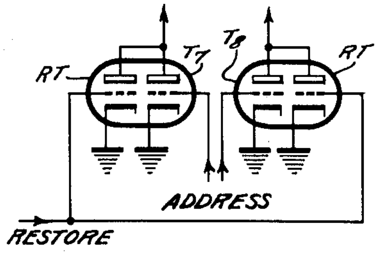
Fig. 5A illustrates a particular address-and-restore circuit suited for use in the commutators of Figs. 4 and 5.

In the cumulative commutator illustrated in Fig. 1, the restoring coil R can be omitted and restoration of the selected cores of both the commutators A and B can be accomplished by simultaneous excitation of both sides of the appropriate number of "a" inputs, the elimination of the restoring winding requiring keying circuitry on the inputs such as exemplified in Fig. 5A and referred to hereafter. Whether or not input windings should be used for restoration, or whether or not a separate restoring winding should be used, will depend on the overall system in which the commutator is to be used.

Figure 4:
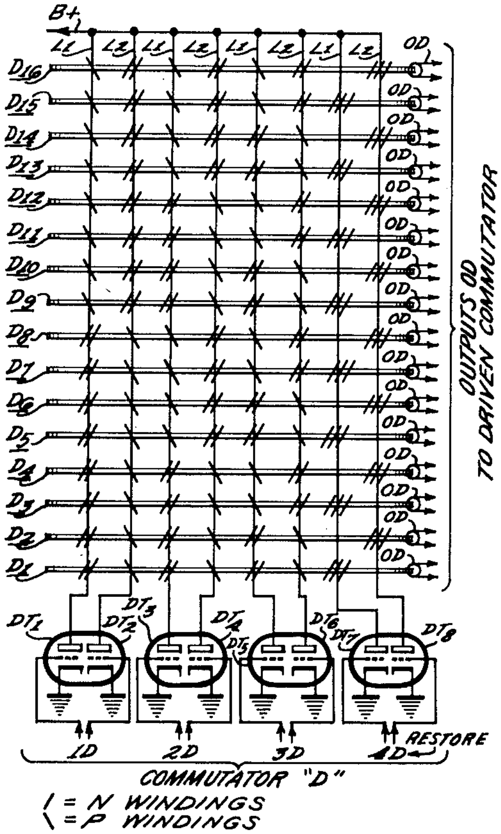
Figs. 4 and 5 illustrate modifications in which the restoring winding is eliminated and in which at least one pair of input coils includes only inhibiting windings.

A commutator requiring no separate restoring winding and in which the P and N-drives are equal for any number of inputs $n$ is illustrated in Fig. 4, and such commutator may be used, for example, in the commutator arrangement of Fig. 1 in replacement of commutator A and in an arrangement in which the driven commutator has 16 sections, 4 input channels and as many as 16 cores per section.

In Fig. 4, the input coils L1, L2 of all pairs (1D–4D) except one (4D) include P-driving and N-driving windings, are arranged in binary pattern as in Fig. 1, the N-driving windings having $(n-2)$ turns. The remaining pair of input coils (4D input) has only N-driving or inhibiting windings with $(n-1)$ turns. By referring to Tables VII and VIII below and using the column-masking procedure above discussed in connection with the preceding tables, it will become apparent that exciting one of each pair of input coils will effect a P-drive of one, and only one, of the cores D1–D16 (Fig. 4) by the combined excitation of $(n-1)$ tubes, each feeding a one turn P-driving winding.

TABLE VII

*Commutator D (Fig. 4)*

| "D" Address | 1D Input | | 2D Input | | 3D Input | | 4D Input | |
|---|---|---|---|---|---|---|---|---|
| | DT1 | DT2 | DT3 | DT4 | DT5 | DT6 | DT7 | DT8 |
| 1 | | √ | | √ | | √ | | √ |
| 2 | | √ | | √ | | √ | √ | |
| 3 | | √ | | √ | √ | | | √ |
| 4 | | √ | | √ | √ | | √ | |
| 5 | | √ | √ | | | √ | | √ |
| 6 | | √ | √ | | | √ | √ | |
| 7 | | √ | √ | | √ | | | √ |
| 8 | | √ | √ | | √ | | √ | |
| 9 | √ | | | √ | | √ | | √ |
| 10 | √ | | | √ | | √ | √ | |
| 11 | √ | | | √ | √ | | | √ |
| 12 | √ | | | √ | √ | | √ | |
| 13 | √ | | √ | | | √ | | √ |
| 14 | √ | | √ | | | √ | √ | |
| 15 | √ | | √ | | √ | | | √ |
| 16 | √ | | √ | | √ | | √ | |

In Table VII:

Each row indicates the "D" address listed in the left hand column. Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE VIII

*Input winding pattern—commutator D (Fig. 4)*

| Core | Windings | | | | | | | |
|---|---|---|---|---|---|---|---|---|
| | 1D Input | | 2D Input | | 3D Input | | 4D Input | |
| | DT1 | DT2 | DT3 | DT4 | DT5 | DT6 | DT7 | DT8 |
| D1 | N | P | N | P | N | P | N | |
| D2 | N | P | N | P | N | P | | N |
| D3 | N | P | N | P | P | N | N | |
| D4 | N | P | N | P | P | N | | N |
| D5 | N | P | P | N | N | P | N | |
| D6 | N | P | P | N | N | P | | N |
| D7 | N | P | P | N | P | N | N | |
| D8 | N | P | P | N | P | N | | N |
| D9 | P | N | N | P | N | P | N | |
| D10 | P | N | N | P | N | P | | N |
| D11 | P | N | N | P | P | N | N | |
| D12 | P | N | N | P | P | N | | N |
| D13 | P | N | P | N | N | P | N | |
| D14 | P | N | P | N | N | P | | N |
| D15 | P | N | P | N | P | N | N | |
| D16 | P | N | P | N | P | N | | N |

In brief, any of the cores D1–D16 (Table VIII) may be uniquely selected by choice of the corresponding address Nos. 1–16. By exciting both coils of the input channel 4D, the previously selected core is turned over to its original N state of saturation, the excitation being of strength $(n-1)$ equal to the previously applied P-drive.

It will be noted that for a total $n(n-1)$ turns in each core, a drive of $(n-1)$ obtains, i. e., the ratio of driving to idle turns $$\frac{1}{n}$$

This is to be compared to the ratio of driving to idle turns of $$\left(\frac{1}{n}+1\right)$$

in, for example, the commutator A of Fig. 1.

Fig. 5 illustrates another commutator requiring no restoring winding and in which the P and N drives are equal to each other for a device with any number of inputs, and in such respect is similar to Fig. 4. In commutator E, Fig. 5, usable in cumulative commutator arrangements shown in Fig. 1 and other figures herein, all but two pairs of the coils L1, L2 for inputs 1E–4E include both P-driving and N-driving windings. The remaining two pairs of input coils, specifically the input coils L1, L2 of input channels 3E and 4E, have only inhibiting or N-driving windings. The N-driving windings of the inputs 1E, 2E have $(n-3)$ turns each whereas the N-driving windings of the channels 3E and 4E have $(n-2)$ turns each. Here, as in Fig. 4, a restoring pulse on an input having only N-windings is equal to the previously applied P-drive, namely, the N-drive is of strength $(n-2)$. For $n(n-2)$ turns (total primary turns), a drive of $(n-2)$ is obtained so that the ratio of driven to idle turns is $$\frac{1}{n}$$

as in commutator D of Fig. 4; as distinguished therefrom, the total number of driving turns is less, a desirable feature when the impedance of the drive should be low.

The input winding pattern for commutator E (Fig. 5) is shown in tabular form in Table X below and which core is selected for each of the addresses Nos. 1–16 (Table IX) can be readily determined by using the column-masking technique above described in connection with the other tables.

TABLE IX

*Commutator E (Fig. 5)*

| "E" Address | 1E Input | | 2E Input | | 3E Input | | 4E Input | |
|---|---|---|---|---|---|---|---|---|
| | DE1 | DE2 | DE3 | DE4 | DE5 | DE6 | DE7 | DE8 |
| 1 | √ | | √ | | √ | | √ | |
| 2 | √ | | √ | | √ | | | √ |
| 3 | √ | | √ | | | √ | √ | |
| 4 | √ | | √ | | | √ | | √ |
| 5 | √ | | | √ | √ | | √ | |
| 6 | √ | | | √ | √ | | | √ |
| 7 | √ | | | √ | | √ | √ | |
| 8 | √ | | | √ | | √ | | √ |
| 9 | | √ | √ | | √ | | √ | |
| 10 | | √ | √ | | √ | | | √ |
| 11 | | √ | √ | | | √ | √ | |
| 12 | | √ | √ | | | √ | | √ |
| 13 | | √ | | √ | √ | | √ | |
| 14 | | √ | | √ | √ | | | √ |
| 15 | | √ | | √ | | √ | √ | |
| 16 | | √ | | √ | | √ | | √ |

In Table IX:

Each row indicates the "E" address listed in the left hand column. Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE X

*Input winding pattern—commutator E (Fig. 5)*

| Core | Windings | | | | | | | |
|---|---|---|---|---|---|---|---|---|
| | IE Input | | 2E Input | | 3E Input | | 4E Input | |
| | DE1 | DE2 | DE3 | DE4 | DE5 | DE6 | DE7 | DE8 |
| E1 | N | P | N | P | N | ------ | N | ------ |
| E2 | N | P | N | P | N | ------ | ------ | N |
| E3 | N | P | N | P | ------ | N | N | ------ |
| E4 | N | P | N | P | ------ | N | ------ | N |
| E5 | N | P | P | N | N | ------ | N | ------ |
| E6 | N | P | P | N | N | ------ | ------ | N |
| E7 | N | P | P | N | ------ | N | N | ------ |
| E8 | N | P | P | N | ------ | N | ------ | N |
| E9 | P | N | N | P | N | ------ | N | ------ |
| E10 | P | N | N | P | N | ------ | ------ | N |
| E11 | P | N | N | P | ------ | N | N | ------ |
| E12 | P | N | N | P | ------ | N | ------ | N |
| E13 | P | N | P | N | N | ------ | N | ------ |
| E14 | P | N | P | N | N | ------ | ------ | N |
| E15 | P | N | P | N | ------ | N | N | ------ |
| E16 | P | N | P | N | ------ | N | ------ | N |

Here again restoration to the N condition of a selected core may be made by simultaneously exciting both coils of the 4E input. Figure 5A shows a simple keying circuit which may be used. It consists of four tubes, RT, T7, T8, RT. The anode of one RT tube is connected to the anode of tube T7, the anode of the other RT is connected to the anode of tube T8. The grids of the RT tubes are connected to the source of N restore signals. The grids of the T7 and T8 tubes are connected to a source of address signals. This simple arrangement may be used in place of tubes DT7 and DT8 in Figure 4, or in place of tubes DE7 and DE8 in Figure 5.

In the commutator arrangements thus far described, a complete binary code is used, i. e., for $n$ inputs, the number of cores and outputs is equal to $2^n$. The incomplete binary code (i. e., any code) may be used. For example, the driving commutator F of Fig. 6 may use a binary-coded decimal system in which four inputs 1F–4F are used selectively to control 10 outputs, the cores corresponding to the six unused binary combinations being simply omitted.

The winding arrangement of commutator F (Fig. 6) is shown in tabular form in Table XII below and which of the cores is selected for any of the 10 addresses (Table XI) can readily be determined by masking the columns of Table XII in accordance with the selected address generally as previously above described.

TABLE XI

*Commutator F—(Fig. 6)*

| "F" Address | 1F Input | | 2F Input | | 3F Input | | 4F Input | |
|---|---|---|---|---|---|---|---|---|
| | FT1 | FT2 | FT3 | FT4 | FT5 | FT6 | FT7 | FT8 |
| 1 | ------ | √ | √ | ------ | √ | ------ | ------ | √ |
| 2 | ------ | √ | √ | ------ | √ | ------ | √ | ------ |
| 3 | √ | ------ | ------ | √ | ------ | √ | ------ | √ |
| 4 | √ | ------ | ------ | √ | ------ | √ | √ | ------ |
| 5 | √ | ------ | ------ | √ | √ | ------ | ------ | √ |
| 6 | √ | ------ | ------ | √ | √ | ------ | √ | ------ |
| 7 | √ | ------ | √ | ------ | ------ | √ | ------ | √ |
| 8 | √ | ------ | √ | ------ | ------ | √ | √ | ------ |
| 9 | √ | ------ | √ | ------ | √ | ------ | ------ | √ |
| 10 | √ | ------ | √ | ------ | √ | ------ | √ | ------ |

In Table XI:

Each row indicates the "F" address listed in the left hand column. Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE XII

*Input winding pattern—commutator F (Fig. 6)*

| Core | Windings | | | | | | | | |
|---|---|---|---|---|---|---|---|---|---|
| | 1F Input | | 2F Input | | 3F Input | | 4F Input | | G Input |
| | FT1 | FT2 | FT3 | FT4 | FT5 | FT6 | FT7 | FT8 | |
| F1 | N | ------ | ------ | N | ------ | N | N | ------ | P |
| F2 | N | ------ | ------ | N | ------ | N | ------ | N | P |
| F3 | ------ | N | N | ------ | N | ------ | N | ------ | P |
| F4 | ------ | N | N | ------ | N | ------ | ------ | N | P |
| F5 | ------ | N | N | ------ | ------ | N | N | ------ | P |
| F6 | ------ | N | N | ------ | ------ | N | ------ | N | P |
| F7 | ------ | N | ------ | N | N | ------ | N | ------ | P |
| F8 | ------ | N | ------ | N | N | ------ | ------ | N | P |
| F9 | ------ | N | ------ | N | ------ | N | N | ------ | P |
| F10 | ------ | N | ------ | N | ------ | N | ------ | ------ | P |

Each of the cores F1–F10 of commutator F is used as in Fig. 1 to supply, when selected, a driving pulse for a corresponding one of the 10 sections GS1–GS10 of commutator G, each section of commutator G having 10 cores so to provide a 100-way or 100-output commutator.

The winding pattern of each section of commutator G is shown in Table XIV and which core of the section (assuming drive of the section by commutator F) is selected respectively for addresses Nos. 1–10 (Table XIII) can be readily determined by using the column-masking procedure above described.

TABLE XIII

*Commutator G—(Fig. 6)*

| "G" Address | G1 Input | | G2 Input | | G3 Input | | G4 Input | |
|---|---|---|---|---|---|---|---|---|
| | GT1 | GT2 | GT3 | GT4 | GT5 | GT6 | GT7 | GT8 |
| 1 | ------ | √ | √ | ------ | √ | ------ | ------ | √ |
| 2 | ------ | √ | √ | ------ | √ | ------ | √ | ------ |
| 3 | √ | ------ | ------ | √ | ------ | √ | ------ | √ |
| 4 | √ | ------ | ------ | √ | ------ | √ | √ | ------ |
| 5 | √ | ------ | ------ | √ | √ | ------ | ------ | √ |
| 6 | √ | ------ | ------ | √ | √ | ------ | √ | ------ |
| 7 | √ | ------ | √ | ------ | ------ | √ | ------ | √ |
| 8 | √ | ------ | √ | ------ | ------ | √ | √ | ------ |
| 9 | √ | ------ | √ | ------ | √ | ------ | ------ | √ |
| 10 | √ | ------ | √ | ------ | √ | ------ | √ | ------ |

In Table XIII:

Each row indicates the "G" address listed in the left hand column.

Each other column indicates the tube designated by the column heading.

A check mark (√) at a row and column intersection indicates energization of the indicated tube for selection of the indicated address. All the check marks in a row therefore indicate all the tubes to be energized for selection of the address indicated by that row.

TABLE XIV

*Input winding pattern—commutator G (Fig. 6)*

| Core | Windings | | | | | | | |
|---|---|---|---|---|---|---|---|---|
| | 1G Input | | 2G Input | | 3G Input | | 4G Input | |
| | GT1 | GT2 | GT3 | GT4 | GT5 | GT6 | GT7 | GT8 |
| G1 | N | ------ | ------ | N | ------ | N | N | ------ |
| G2 | N | ------ | ------ | N | ------ | N | ------ | N |
| G3 | ------ | N | N | ------ | N | ------ | N | ------ |
| G4 | ------ | N | N | ------ | N | ------ | ------ | N |
| G5 | ------ | N | N | ------ | ------ | N | N | ------ |
| G6 | ------ | N | N | ------ | ------ | N | ------ | N |
| G7 | ------ | N | ------ | N | N | ------ | N | ------ |
| G8 | ------ | N | ------ | N | N | ------ | ------ | N |
| G9 | ------ | N | ------ | N | ------ | N | N | ------ |
| G10 | ------ | N | ------ | N | ------ | N | ------ | N |

By similarly utilizing each core of commutator G to drive a section of another driven commutator (not shown), any one of 10,000 cores can be selected from 12 input channels.

Figure 6:
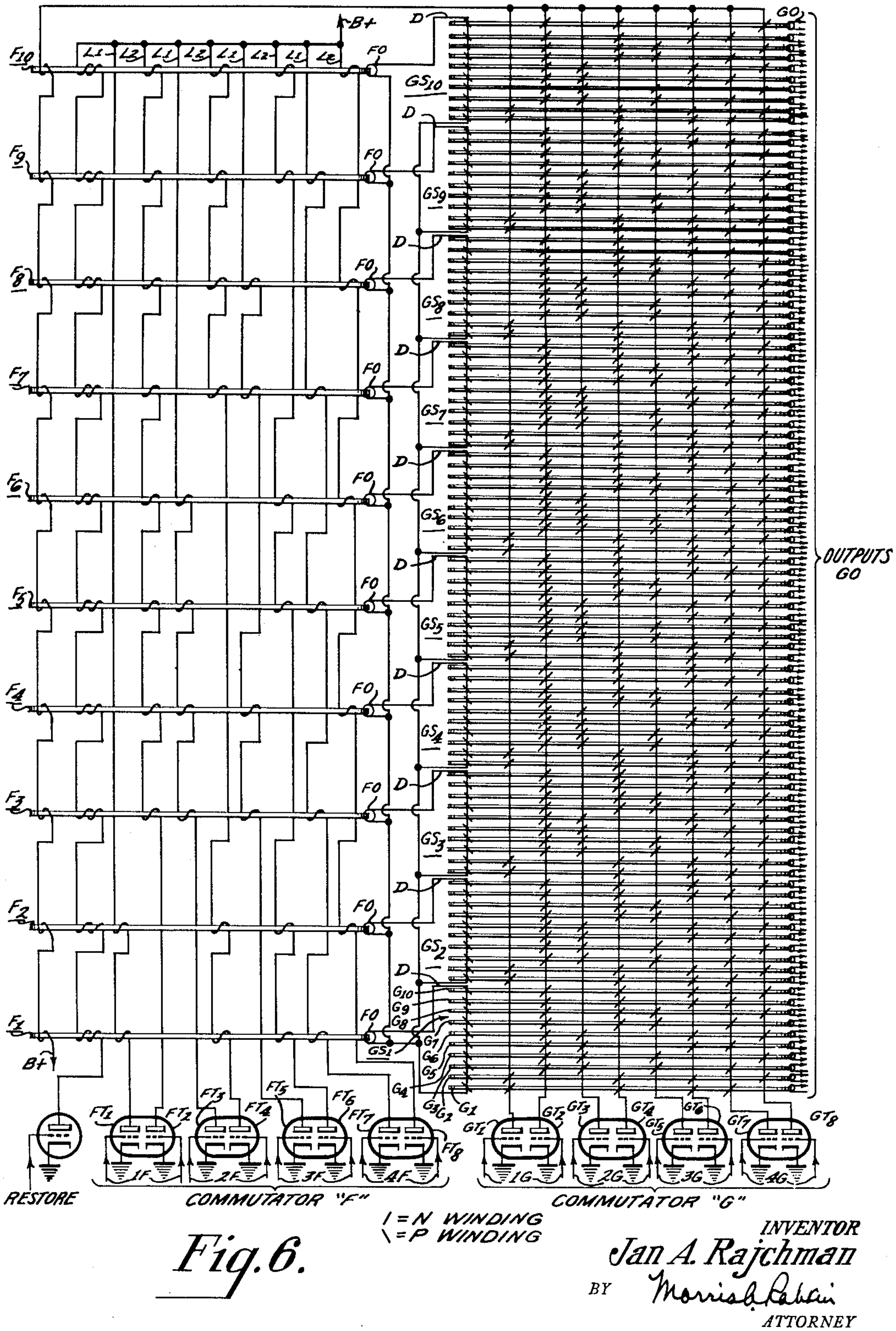
Fig. 6 is a decimal-coded modification of Fig. 1.

Any core of a magnetic memory matrix of the type described in the aforesaid RCA Review article having, for example, 10,000 cores can be selected by using two cumulative arrangements such as shown in Fig. 6, the outputs of one driven commutator energizing the respective row coils of the memory matrix and the outputs of the other driven commutator energizing the column coils of the memory matrix. Such arrangement has utility in some information-handling applications.

In the commutators previously described, the winding patterns for each commutator section follows an ordinary binary code, with the result that a shift from one address to the next numerically higher or lower address in some cases involves switching in several of the input coils. By arranging the windings in a cyclic binary pattern, the change in address for any next higher or lower number thereof requires switching in only one of the inputs. By way of example, in Fig. 7 there is shown a commutator corresponding with commutator A of Fig. 1 except that the coil windings are arranged in a cyclic binary code. Using the masking procedure above described with Tables XV and XVI below, it will be apparent that for the successive addresses in ascending or descending order, it is only necessary to shift between the input coils of one or another pair, the selection of the input coils of the other channels remaining the same.

TABLE XV

*Commutator H—(Fig. 7)*

| (Cyclic Binary) "H" Address | H1 Input | | H2 Input | | H3 Input | |
|---|---|---|---|---|---|---|
| | HT1 | HT2 | HT3 | HT4 | HT5 | HT6 |
| 1 | ✓ | | | ✓ | | ✓ |
| 2 | ✓ | | | ✓ | ✓ | |
| 3 | ✓ | | ✓ | | ✓ | |
| 4 | ✓ | | ✓ | | | ✓ |
| 5 | | ✓ | ✓ | | | ✓ |
| 6 | | ✓ | ✓ | | ✓ | |
| 7 | | ✓ | | ✓ | ✓ | |
| 8 | | ✓ | | ✓ | | ✓ |

TABLE XVI

*Input winding pattern—commutator H (Fig. 7)*

| Core | Windings | | | | | |
|---|---|---|---|---|---|---|
| | 1H Input | | 2H Input | | 4H Input | |
| | HT1 | HT2 | HT3 | HT4 | HT5 | HT6 |
| 1 | N | P | N | P | N | P |
| 2 | N | P | N | P | P | N |
| 3 | N | P | P | N | P | N |
| 4 | N | P | P | N | N | P |
| 5 | P | N | P | N | N | P |
| 6 | P | N | P | N | P | N |
| 7 | P | N | N | P | P | N |
| 8 | P | N | N | P | N | P |

Figure 7:
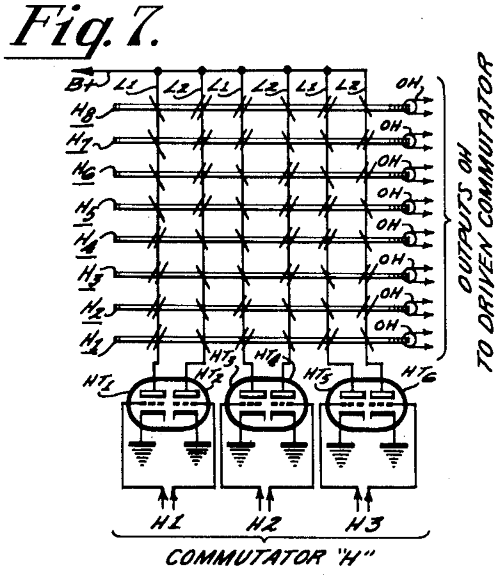
Fig. 7 is a driving commutator modification suited for cyclic binary operation.

The relation between the particular binary coding of the windings of commutator A of Fig. 1 and the particular cyclic binary code pattern of the windings of Fig. 7 is apparent from Table XVII below.

TABLE XVII

| Fig. 1 Address Number | Fig. 7 Address | Binary | Cyclic Binary | Fig. 1 Address Number | Fig. 7 Address |
|---|---|---|---|---|---|
| 1 | 1 | 000 | 000 | 1 | 1 |
| 2 | 2 | 001 | 001 | 2 | 2 |
| 3 | 4 | 010 | 011 | 4 | 3 |
| 4 | 3 | 011 | 010 | 3 | 4 |
| 5 | 7 | 100 | 110 | 7 | 5 |
| 6 | 8 | 101 | 111 | 8 | 6 |
| 7 | 6 | 110 | 101 | 6 | 7 |
| 8 | 5 | 111 | 100 | 5 | 8 |

From the foregoing and from Table XVII, it will be appreciated that the winding pattern of any of the other commutators may readily be converted to a cyclic binary.

In brief resume, a feature common to all of the various arrangements shown, as well as equivalents thereof, is the economy of core windings attained by cumulative use of commutators, and in some modifications and equivalents thereof, further reduction in the number of core turns is obtained by elimination of restoring windings by use of one or more of the address inputs for such purpose.

What is claimed is:

1. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, said driven commutators each having magnetic cores, the number of cores per section of the driven commutator not exceeding 2 raised to a power equal to the number of pairs of input coils addressing the driven commutator.

2. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, said driven commutators each having magnetic cores, the number of cores per section of the driven commutator not exceeding 2 raised to a power equal to the number of pairs of input coils addressing the driven commutator, in which a restoring coil is inductively coupled to cores of the driving commutator, the energization of said restoring coil returning the aforesaid selected core of the driving commutator to its original direction of saturation and the consequent excitation of the output winding of that core driving the aforesaid selected core of the driven commutator to its original direction of saturation.

3. A cumulative magnetic commutator arangement comprising at least two groups of paired input coils, a single-section driving commutator addressed by one of said groups and having magnetic cores in number not exceeding 2 raised to a power equal to the number of pairs in said one of said groups, a plurality of driven commutators coupled to be driven by said driving commutator, each of said driven commutators being addressed by another of said groups of input coils and having sections in number corresponding with the number of cores per section of the preceding commutator, the number of cores per section of the driven commutator not exceeding 2 raised to a power equal to the number of pairs of input coils addressing the driven commutator, the circuit means for applying a restoring pulse to at least one pair of input coils of the groups to restore to their original direction of saturation the aforesaid selected cores of the driving and driven commutators.

4. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, the number of cores per section of the driven commutator not exceeding 2 raised to a power equal to the number of pairs of input coils addressing the driven commutator, and at least one pair of input coils for the driving commutator including driving and inhibiting windings for each core.

5. A cumulative magnetic commutator arrangement comprising at least two groups of paired input coils, a single-section driving commutator addressed by one of said groups and having magnetic cores in number not exceeding 2 raised to the power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, the number of cores per section of the driven commutator not exceeding 2 raised to a power equal to the number of pairs of input coils addressing the driven commutator, and each pair of input coils for the driving commutator including driving and inhibiting windings for each core.

6. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, said driven commutators each having magnetic cores, the number of cores per section of the driven commutator not exceeding 2 raised to a power equal to the number of pairs of input coils addressing the driven commutator, in which certain pairs of input coils for the driving commutator include both driving and inhibiting windings for each core and in which the remaining pairs of input coils for the driving commutator include only inhibiting windings inductively coupled only to certain cores.

7. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, said driven commutators each having magnetic cores, the number of cores per section of the driven commutator not exceeding 2 raised to a power equal to the number of pairs of input coils addressing the driven commutator, in which each pair of input coils for the driving commutator includes only inhibiting windings and in which an additional coil for said driving commutator is in circut with all driven commutator input coils and includes a driving winding for each core of said driving commutator.

8. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator, said driven commutators each having magnetic cores, the number of cores per section of the driven commutator not exceeding 2 raised to a power equal to the number of pairs of input coils addressing the driven commutator, in which each pair of input coils for the driven commutator includes only inhibiting windings.

9. A cumulative magnetic commutator arrangement utilizing magnetic cores for selecting any one of not more than $2^n$ outputs from $n$ inputs comprising $n$ pairs of input coils consisting of a group of $(n-b)$ pairs and a group of $b$ pairs, a driving commutator having not more than $2^{(n-b)}$ cores and addressed from said first-named group of input coils, each of said cores having an output winding excited upon reversal in direction of saturation, and a driven commutator having sections in number corresponding with the cores of said driving commutator, each commutator section being driven from a corresponding core of said driving commutator and having not more than $2^b$ magnetic cores whose direction of saturation is controllable from said second-named group of input coils, the energization of a selected one of each pair of both groups of input coils uniquely determining which one of the cores of said driven commutator reverses in direction of saturation.

10. A cumulative binary magnetic commutator arrangement comprising at least two groups of paired input coils, a single-section driving commutator addressed by one of said groups and having magnetic cores in number not exceeding 2 raised to a power equal to the number of pairs of coils in said one of said groups, and at least one driven commutator, each of said driven commutators being addressed by another of said groups of input coils and having sections in number corresponding with the number of cores per section of the preceding commutator and having magnetic cores, the number of cores per section of the driven commutator not exceeding 2 raised to a power equal to the number of input pairs addressing the driven commutator.

11. A binary magnetic commutator arrangement utilizing magnetic cores for selecting any one of $2^n$ outputs from $n$ inputs comprising $n$ pairs of input coils consisting of a group of $(n-b)$ pairs and a group of $b$ pairs, a driving commutator having $2^{(n-b)}$ magnetic cores whose direction of saturation is reversible by said first-named group of input coils, each of said cores having an output winding, and a driven commutator having $2^{(n-b)}$ sections, each section having $2^b$ magnetic cores whose direction of saturation is reversible by said second-named group of input coils, the energization of a selected one of each pair of both groups of input coils uniquely determining which one of the cores of said driven commutator is reversed in direction of saturation.

12. A cumulative magnetic commutator arrangement comprising a plurality of magnetic commutators each comprising a plurality of magnetic cores, pairs of input coils inductively coupled in combinational code to cores of one of said commutators, the number of pairs being less than the number of cores, said one of said commutators having output windings for driving cores of the next of the other commutators, and pairs of input coils for the cores of said other commutators, the number of pairs being less than the number of said other commutators, the selective energization of one input coil of each of said first-named pairs determining which core of said one of said commutators reverses in direction of saturation for selection of one of said other commutators and jointly with concurrent selective energization of one input coil of each of said second-named pairs thereof determining which core of the selected commutator is reversed in direction of saturation with consequent excitation of its output winding.

13. A magnetic commutator arrangement utilizing magnetic cores for selecting any one of a large number of outputs from a small number of inputs characterized by enhanced utilization of input turns on the cores and enhanced efficiency of utilization of the winding space of the cores comprising a driving commutator having a plurality of magnetic cores, each with an output winding; pairs of input coils for the cores of said driving commutator, the number of pairs being less that the number of cores and the selective energization of one coil of each of said pairs determining which one of said cores reverses in direction of its saturation with consequent excitation of its output winding; a driven magnetic commutator having sections, each section having a plurality of saturable magnetic cores, each section core having a driving winding coupled to a different one of said driving commutator cores and each section core having an output winding; and pairs of input coils for the cores of said driven commutator, the number of said last named pairs being less that the number of said driven commutator sections and the selective energization of one coil of each of said pairs determining which one of the cores of the selected driven commutator reverses in polarity of its saturation with consequent excitation of the associated output winding.

14. A magnetic commutator arrangement utilizing magnetic cores for selecting any one of a large number of outputs from a small number of inputs characterized by enhanced utilization of input turns on the cores and enhanced efficiency of utilization of the winding space of the cores comprising a driving commutator having a plurality of magnetic cores, each with an output winding; pairs of input coils for the cores of said driving commutator and consisting solely of inhibiting winding inductively coupled in combinatorial code to said driving commutator cores, the number of pairs being less than the number of cores and the selective energization of one coil of each of said pairs determining which one of said cores reverses in direction of its saturation with consequent excitation of its output winding; a driven magnetic commutator having sections, each section having a plurality of saturable magnetic cores, each section core having a driving winding coupled to a different one of said driving commutator cores and each section core having an output winding; and pairs of input coils for the cores of said driven commutator, the number of said last named pairs being less than the number of said driven commutator sections and the selective energization of one coil of each of said pairs determining which one of the cores of the selected driven commutator reverses in polarity of its saturation with consequent excitation of the associated output winding.

15. A commutator arrangement as in claim 14 additionally including a restoring coil inductively coupled to each of said cores.

16. A cumulative magnetic commutator arrangement comprising a plurality of magnetic commutators each comprising a plurality of magnetic cores, pairs of input coils inductively coupled in combinatorial code to cores of one of said commutators, the number of pairs being less than the number of cores, said one of said commutators having output windings for driving cores of the next of the other commutators, and pairs of input coils for the cores of said other commutators, the number of pairs being less than the number of said other commutators, the selective energization of one input coil of each of said first-named pairs determining which core of said one of said commutators reverses in direction of saturation for selection of one of said other commutators and jointly with concurrent selective energization of one input coil of each of said second-named pairs thereof determining which core of the selected commutator is reversed in direction of saturation with consequent excitation of its output winding, at least one of said pairs of input coils for said one commutator consisting solely of inhibiting windings, and means for applying restoring pulses to at least one of said last-named pairs of input coils.

17. A commutator arrangement comprising a plurality of magnetic cores each having an output winding, and pairs of input coils inductively coupled in combinational code to said cores and providing on each core a number of input turns proportional to $n(n-r)$, $n$ being the number of pairs of input coils, the coils of $r$ of said pairs consisting solely of inhibiting windings each having a number of turns proportional to $(n-r)$ and the coils of the remainder of said pairs each having both P driving and inhibiting windings, each of the last-named inhibiting windings having a number of turns proportional to $(n-r-1)$ whereby the ratio of active to idle input turns per core is $$\frac{1}{n}$$

for energization of any selected combination of one coil of each input pair.

18. A commutator arrangement comprising a plurality of magnetic cores each having an output winding, and pairs of input coils inductively coupled in combinational code to said cores and providing on each core a number of input turns proportional to $n(n-r)$, $n$ being the number of pairs of input coils, the coils of $r$ of said pairs consisting solely of inhibiting windings each having a number of turns proportional to $(n-r)$ and the remainder of said pairs each having both P driving and inhibiting windings, each of said last-named inhibiting windings having a number of turns proportional to $(n-r-1)$ whereby the ratio of active to idle input turns per core is $$\frac{1}{n}$$

for energization of any selected combination of one coil for each input pair.

19. A magnetic switch comprising a plurality of magnetic cores, a plurality of groups of magnetic cores, each of said plurality of cores being associated with a different core group, a plurality of first coil means coupled to said plurality of cores in accordance with a first combinatorial code, a plurality of first output coils, each of said first output coils inductively couplings one of said plurality of cores with all the cores in its associated core group, a plurality of second output coils each of which is coupled to a different one of the cores in said groups of cores, a plurality of second coil means coupled to said plurality of core groups in accordance with a second combinatorial code having a desired relationship to said first combinatorial code, first means to selectively excite said plurality of first coil means to drive a desired one of said plurality of cores to a desired saturation polarity, and second means to selectively excite said plurality of second coil means simultaneously with said first coil means to inhibit all the cores of the associated core group except a desired one from being driven toward saturation of predetermined polarity by said desired one of said plurality of cores being driven.

20. A magnetic commutator arrangement comprising at least two groups of input coils, each coil of a group being paired with another coil of the same group, a succession of commutators each driving a succeeding one and each addressed by a different one of said groups, each said commutator having a plurality of magnetic cores in sections, the number of sections of any commutator not exceeding two raised to a power equal to the number of pairs of coils in the group addressing the same commutator, the number of cores per section of any commutator not exceeding two raised to a power equal to the number of pairs of input coils addressing the preceding commutator.

21. A magnetic commutator arrangement comprising two groups of input coils, each coil of a group being paired with another coil of the same group, a driving commutator having cores addressed by one of said groups, said cores in number not exceeding two raised to a power equal to the number of pairs of coils in said one group, another commutator driven by said driving commutator and having a plurality of cores in sections, each said section being coupled to a different driving commutator core, said driven commutator sections being addressed by the other of said groups of input coils, the number of cores per section of the driven commutator not exceeding two raised to a power equal to the number of pairs of input coils addressing said driven commutator.

22. A cumulative magnetic commutator arrangement comprising at least two groups of paired input coils, a single-section driving commutator addressed by one of said groups and having magnetic cores in number not exceeding 2 raised to a power equal to the number of pairs in said one of said groups, and a plurality of driven commutators coupled to be driven by said driving commutator, each of said driven commutators being addressed by another of said groups of input coils and having sections in number corresponding with the number of cores per section of the preceding commutator said driven commutators each having magnetic cores, the number of cores per section of the driven commutator not exceeding 2 raised to a power equal to the number of pairs of input coils addressing the driven commutator, said cores having rectangular hysteresis loops.

23. A cumulative binary magnetic commutator arrangement comprising at least two groups of paired input coils, a single-section driving commutator addressed by one of said groups and having magnetic cores in number not exceeding 2 raised to a power equal to the number of pairs of coils in said one of said groups, and at least one driven commutator, each of said driven commutators being addressed by another of said groups of input coils and having sections in number corresponding with the number of cores per section of the preceding commutator and having magnetic cores, the number of cores per section of the driven commutator not exceeding 2 raised to a power equal to the number of input pairs addressing the driven commutator, said cores having rectangular hysteresis loops.

24. A magnetic switch comprising a plurality of magnetic cores, a plurality of groups of magnetic cores, each of said plurality of cores being associated with a different core group, a plurality of first coil means coupled to said plurality of cores in accordance with a first combinatorial code, a plurality of first output coils, each of said first output coils inductively coupling one of said plurality of cores with all the cores in its associated core group, a plurality of second output coils each of which is coupled to a different one of the cores in said groups of cores, a plurality of second coil means coupled to said plurality of core groups in accordance with a second combinatorial code having a desired relationship to said first combinatorial code, first means to selectively excite said plurality of first coil means to drive a desired one of said plurality of cores to a desired saturation polarity, and second means to selectively excite said plurality of second coil means simultaneously with said first coil means to inhibit all the cores of the associated core group except a desired one from being driven toward saturation of predetermined polarity by said desired one of said plurality of cores being driven, said cores having rectangular hysteresis loops.

25. A magnetic commutator arrangement comprising at least two groups of input coils, each coil of a group being paired with another coil of the same group, a succession of commutators each driving a succeeding one and each addressed by a different one of said groups, each said commutator having a plurality of magnetic cores in sections, the number of sections of any commutator not exceeding two raised to a power equal to the number of pairs of coils in the group addressing the same commutator, the number of cores per section of any commutator not exceeding two raised to a power equal to the number of pairs of input coils addressing the preceding commutator, said cores having rectangular hysteresis loops.

26. A decimal cumulative magnetic commutator arrangement comprising at least two groups of paired input coils, each said group having four pairs of said input coils, a single section driving commutator addressed by one of said groups and having ten magnetic cores, and a plurality of driven commutators coupled to be driven by said driving commutator, each of said driven commutators being addressed by another of said groups of input coils and having ten sections having ten magnetic cores for each said driven commutator section.

References Cited in the file of this patent

UNITED STATES PATENTS

| | | |
|---|---|---|
| 1,547,964 | Semat | July 28, 1925 |
| 2,053,156 | Livingston | Sept. 1, 1936 |
| 2,342,886 | Murphy | Feb. 29, 1944 |
| 2,518,022 | Keister | Aug. 8, 1950 |

OTHER REFERENCES

RCA Review, June 1952, pp. 183-201.

Electronic Engineering, May 1954, pp. 192–199.